March 18, 1958 — J. A. LOCKHEED — 2,827,137
NON-SKIDDING BRAKES
Filed June 27, 1955
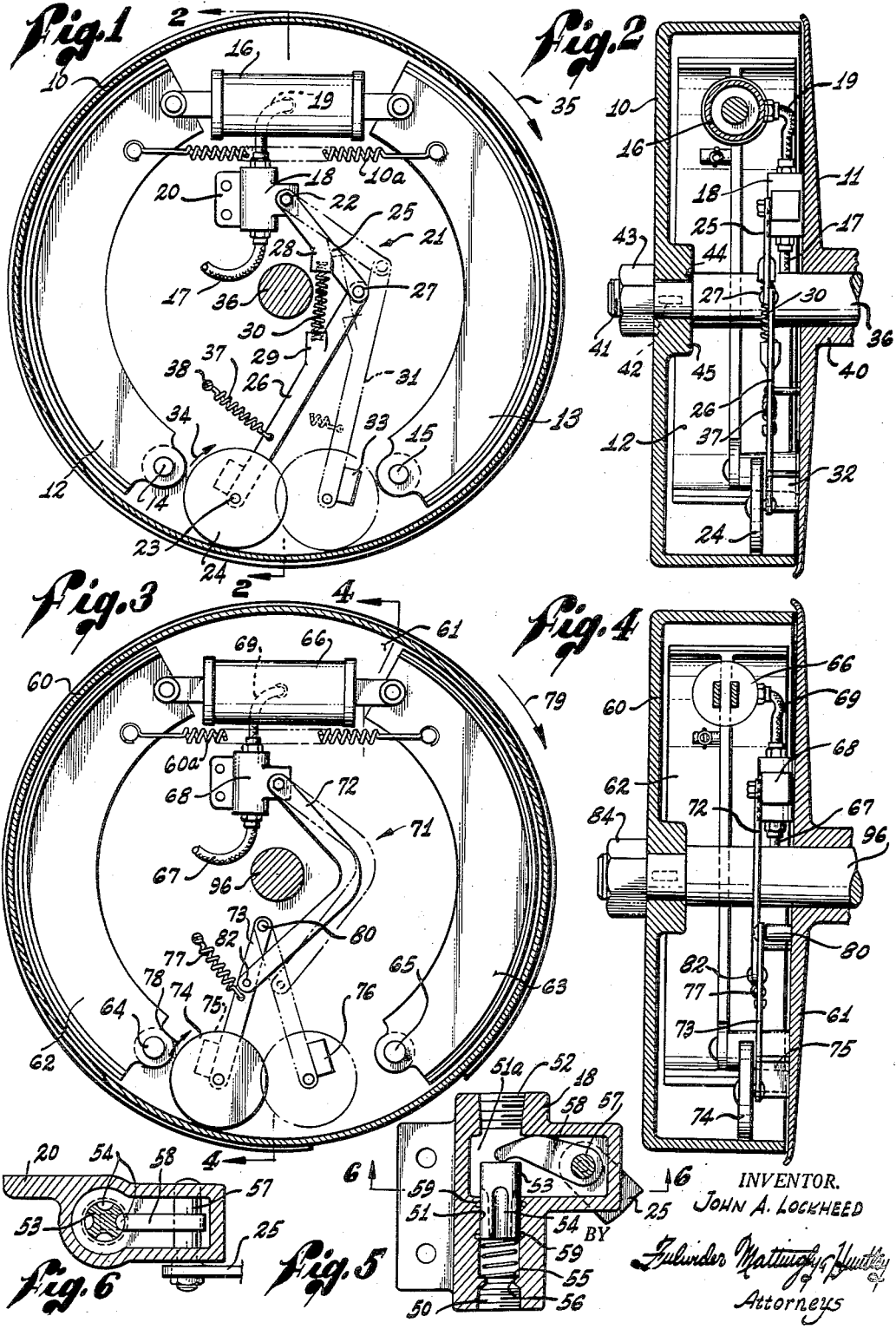
INVENTOR.
JOHN A. LOCKHEED
BY
Attorneys _United States Patent Office_

2,827,137
Patented Mar. 18, 1958

2,827,137

NON-SKIDDING BRAKES

John A. Lockheed, North Hollywood, Calif.

Application June 27, 1955, Serial No. 518,195

11 Claims. (Cl. 188—181)

This invention pertains to brakes and in particular to a device for automatically interrupting the application of braking force whenever rapid deceleration or skidding is detected by the device.

It is well known that the greatest braking effect is secured when the wheels of a vehicle are turning rather than when they are locked and sliding upon the surface of the road. When a tire starts to skid, there is a sudden great decrease in braking effect. The co-efficient of friction is much less for sliding a tire along one spot of the surface than for the nearly tearing friction all around the circumference of the tire just prior to skidding. Moreover, no stopping friction is being used on the brake lining as the tire skids, since there is no relative motion between lining and brake shoe under such conditions. Furthermore, it is desirable to prevent skidding because it is accompanied by loss of steering control and by excessive wear of the tire by the road's surface. During deceleration of a vehicle caused by application of the brakes, the brakes of any one of the wheels may lock first because of irregularity in the road's surface or the braking system; this produces an unbalanced retarding action which may change the direction of movement of the vehicle especially if one of the front or steering wheels locks. For example, when the ground surface is coated with ice or snow, one wheel may hit a slick spot, and with equal braking pressure on all wheels, only the one wheel will start to skid, thus throwing the whole vehicle into a dangerous slide, in which the operator cannot control it by steering. Often, the operator cannot tell when tires start to skid and cannot react quickly enough to decrease his application of braking force. Under emergency conditions the operator of a vehicle cannot resist putting on all force at his command to stop the vehicle.

Many of the devices which have been previously proposed for the prevention of skidding have required entire reconstruction of the braking system and were not suitable for installation on existing brakes by means of readily installed attachments. Other previous systems relied upon governors or massive inertia flywheels. Still others involved complicated mechanisms or complex electrical or hydraulic devices (particularly in the case of airplanes). These devices increase the number of parts and the likelihood of failure, and a mechanic cannot always readily understand or service them, or visually observe a defect in them.

Accordingly, it is a principal object of this invention to provide a device to be added or incorporated into existing automobile, truck, or airplane brake systems to make it impossible, or nearly impossible, for the operators to skid the tires.

It is another major object of my invention to provide an arrangement for skid prevention which can operate within the confines of existing brake drums, brake shoes, and hydraulic mechanisms and which can be sold as an accessory and installed in existing brake systems, particularly on trucks and passenger cars.

It is a further object of the invention to provide a design capable of operating independently on each wheel. It is still another object to provide a de-braking device which will not interfere with full brake application when the vehicle is stopped, or parked, or in reverse.

It is an object of my invention to provide a skid prevention device for each wheel, each of said devices being capable of operating independently of the others.

Finally, it is an object of this invention to achieve these ends with a relatively simple device adapted to adjustment, rugged in construction, and dependable in operation. Furthermore, it is an object to provide a device which is so simple that defects can be detected by a mechanic of ordinary skill, and serviced by him.

The present invention makes use of a skid sensing roller supported in rolling contact with the interior surface of a brake drum. Whenever the vehicle is in motion, rotation of the wheel, including the brake drum, causes the skid sensing roller to rotate in the same direction. The skid sensing roller is mounted on one end of an actuating linkage, the other end of which controls a de-braking device. In its preferred form, and in the most likely fields of application, the de-braking device will be a de-braking valve in a hydraulic braking system; however, the invention is also applicable to air brakes and mechanical brakes.

The skid sensing roller is held in an inactive position by means of one or more springs whenever the vehicle is in forward or backward motion, except when rotation of the wheel in a direction corresponding to forward motion of the vehicle is suddenly interrupted. Under such conditions only the sensing roller, continuing its rolling on the brake drum surface by virtue of its inertia, shifts its position through a few degrees of arc along the brake drum surface. This movement shifts the actuating linkage from the inactive position in which it is held under all other conditions, to a de-braking position in which the de-braking valve pushes back the flow of liquid to relieve the braking pressure and to prevent application of further pressure until the wheel stops skidding and starts to rotate again. The de-braking position is only achieved when the wheel suddenly decelerates (as in a skid) and the inertia of the roller moving forward on the brake drum overcomes the spring or springs holding it in the inactive position and shifts the actuating linkage to the de-braking position in which the de-braking valve operates to overcome the pressure of the flow of liquid in the hydraulic brake actuating system. The spring or springs holding the actuating linkage in the inactive position are only intended to be light enough to hold the actuating linkage and the roller in the inactive position against extraneous outside forces such as gravity when on a steep hill. The spring in the de-braking valve also holds the linkage in this position and it may not be necessary to have a restraining spring on the actuating linkage at all. Interruption of braking effort is only momentary, since the roller is brought to a stop after moving through only a few degrees of arc, by the action of the spring or springs, by the hydraulic pressure in the de-braking valve, or by encountering a movement-limiting stop projecting from the backing plate (which is a non-rotating portion of the brake housing); but during this momentary interruption of braking effort, rotation of the wheel is resumed. The roller is returned to inactive position by the resumption of forward rotation by the hydraulic pressure in the de-braking valve, and by the action of the spring or springs. The actuating linkage is moved into inactive position by the return of the roller, and the de-braking valve is opened, allowing braking effort to be resumed. If braking effort continues to be excessive and skidding repeatedly occurs, or tends to occur, the actuating roller will swing rapidly back and forth between inactive and de-braking position in rapid succession as the brake drum alternately experiences sudden decelerations and resumptions of speed of rotation, respectively. The pressure on the brake shoes will thus be alternately decreased and increased in rapid succession, which is known to be desirable when running under skidding conditions.

Two examples of the present invention are illustrated in the accompanying drawing in which:

Figure 1 is a side view of a braking mechanism in which one of the embodiments of the invention has been incorporated;

Figure 2 is a view in vertical section along the line 2—2 of Figure 1;

Figure 3 is a side view of a braking mechanism in which another embodiment of the invention, employing an actuating linkage different from that of Figures 1 and 2, has been incorporated;

Figure 4 is a view in vertical section along the line 4—4 of Figure 3;

Figure 5 is a cross-sectional view of a de-braking shut-off valve; and

Figure 6 is a sectional view taken along the line 6—6 of Figure 5.

In Figure 1 a brake drum 10 is shown with the end in fragmentary view only. The numeral 11 indicates the backing plate for the brake assembly which is a non-rotating part supported in any well known manner on the wheel axle housing. Co-operating with the interior surface of the flange of brake drum 10 is a pair of arcuate brake shoes 12 and 13 movably mounted on backing plate 11 by means of mounting pins 14 and 15 about which brake shoes 12 and 13 respectively are adapted to rotate into engagement with the interior surface of the flange of brake drum 10, but are restrained by spring 10a. Also supported on backing plate 11 is a normal hydraulic-actuated brake shoe operating means 16 which is shown diagrammatically as it may be of any suitable known construction, for expanding and applying pressure against the free end of the brake shoes 12 and 13. As in any normal configuration, braking is accomplished by supplying fluid under pressure to brake shoe operating means 16 by way of hydraulic line through de-braking valve 18, and line 19. De-braking valve 18 is mounted on backing plate 11 by means of bracket 20.

De-braking valve 18 is controlled between an inactive, or fully open position, and a de-braking, or shut-off position, by means of an actuating linkage, indicated generally by the numeral 21, the valve operating end 22 of which is pivoted in de-braking valve 18. The other end of actuating linkage 21 carries a skid-sensing roller 24, which is adapted to roll on the interior surface of brake drum 10 in the position shown in full line whenever brake drum 10 is rotating with either forward or backward motion of the vehicle. Actuating linkage 21 is comprised of two links, a valve operating link 25, and a roller carrying link 26 pinned at their adjacent ends by pin 27 to permit links 25 and 26 to rotate relative to one another about pin 27 in a plane parallel to backing plate 11. Links 25 and 26 carry shoulders 28 and 29 between which is mounted a compression spring 30 so that in all positions of actuating linkage 21, the angle between link 25 and 26 is maintained at the maximum that is physically possible with the mechanism, and roller 24 is kept in contact with the interior surface of brake drum 10. Roller 24 is restricted to movement through only a few degrees of arc along brake drum 10 between the inactive position shown in full line and the de-braking position shown in dashed line 31 by means of a pair of stops 32 and 33 mounted on backing plate 11. When linkage 21 is in the inactive position, i. e., when the vehicle is at rest or is moving in a forward or backward direction, wheel 24 rotates with the same direction of rotation as brake drum 10; forward vehicle movement is indicated by arrow 35. In this position the linkage spring 30 just clears axle 36.

Preferably, a spring 37, attached at one end 38 to stationery backing plate 11, and at the other end to roller bearing link 26, holds linkage 21 resiliently in inactive position. It is possible, however, to dispense with spring 37 and rely entirely upon the spring action within the de-braking valve 18 that will be described hereinafter.

In the sectional view of Figure 2, brake drum 10 and backing plate 11 are seen in vertical section. Axle 36 passes through stationery backing plate 11 at annular shoulder 40. Brake drum 10, and the wheel (not shown) carried by it are integrally mounted on the reduced and threaded end of axle 36 by means of key 42 and nut 43; the reduced cross section of threaded end 41 provides a shoulder at 44 against which the annular shoulder 45 of brake drum 10 is tightened by nut 43. The wheel, axle, and brake arrangement are merely exemplary; the invention is equally adapted to other arrangements, such as those of front wheels.

The construction of de-braking valve 18 is seen in the sectional view Figure 5 and Figure 6. Application of the brake delivers fluid under high pressure to de-braking valve inlet 50 through line 17. De-braking valve 18 is provided with an internal bore 51 for the passage of fluid to outlet 52 through line 19 to brake actuating means 16. The passage or shutting off of brake fluid is controlled by the position of a valve piston 53 which is provided throughout the lower half of its cylindrical surface with a plurality of longitudinal grooves 54 to permit the passage of fluid when piston 53 is in its uppermost position as illustrated in Figure 5. Piston 53 is ordinarily maintained at the upper end of its stroke, as illustrated, by means of valve spring 55 which seats at its lower end on an integral annular shoulder 56 in bore 51. Shut off is accomplished when valve operating link 25 is moved in a counter-clockwise direction, rotating shaft 57 and cam 58, which is mounted on cam shaft 57 to rotate integrally therewith. The counter-clockwise movement of operating link 25, shaft 57, and cam 58 depresses the valve piston 53, compressing spring 55, so that grooves 54 are entirely sunk within bore 51 and fluid is unable to pass from grooves 54 into enlarged chamber 51a, and further movement actually pushes back the fluid. Also, the depression of piston 53 reduces the pressure of fluid on brake actuating means 16. A pair of O-rings 59 recessed in internal bore 51 contact the surfaces of piston 53 and guide it in its downward movement, and prevent leakage when it is in the lower, or de-braking position.

In operation, roller 24 and valve operating linkage 21 remain in the inactive position illustrated in full line in Figure 1, at almost all times. Roller bearing link 26 is held against inactive position stop 32 by the action of retaining spring 37 and de-braking valve spring 55. It is only on the mometary occasions when the vehicle is moving in a forward direction and brake drum 10 and roller 24 are rotating in a clockwise direction, and brakes are suddenly applied and brake drum 10 experiences sudden deceleration, or becomes locked and discontinues rotation altogether, that the rotational momentum of roller 24 causes it to move in a counter-clockwise direction, thus momentarily actuating de-braking valve 18 and relieving braking pressure. As soon as linear movement of roller 24 is brought to a stop either by roller bearing link 26 striking the de-braking position stop 33, or by resumption of wheel motion, the roller returns to an inactive position. During the interval, however, interruption of braking pressure permits resumption of rotation of brake drum 10 and until skidding occurs again, roller 24 remains in inactive position. In all positions roller 24 remains in contact with the interior surface of brake drum 10 because of the elbow action of linkage 21, which is free to expand and is kept in contact position by spring 30.

In the second embodiment of the invention, shown in Figures 3 and 4, the principal difference is in the valve actuating linkage and in the fact that the skid-sensing roller swings out of contact with the interior of the brake drum when it reaches its maximum de-braking position. Otherwise, the parts are the same. A brake drum 60, shown in fragmentary view only, in Figure 3, rotates with axle 96 and a wheel not shown, while backing plate 61 remains stationery, i. e., relative to the vehicle but without rotating with brake drum 60. A pair of arcuate brake shoes 62 and 63 are pinned by pins 64 and 65 to backing plate 61 and adapted to engage with the interior surface of the flange of brake drum 60 to achieve braking action.

A hydraulic cylinder 66 is mounted on backing plate 61, and, when supplied with brake fluid under pressure by way of hydraulic line 67, through de-braking valve 68, and line 69, causes brake shoes 64 and 65 to be rotated into engagement with the interior surface of brake drum 10. When braking pressure is not being applied, brake shoes 64 and 65 are restrained from engaging with brake drum surface by the tension of spring 60a De-braking valve 68 is controlled between an inactive, or fully open position, and the de-braking or shut-off position, by means of an actuating linkage indicated generally by the numeral 71, and comprised of a pair of operating links, a valve actuating link 72, and a roller carrying link 73, a skid-sensing roller 74 being rotatably mounted in the lower end of the latter link.

The mounting and operation of linkage 71 are quite different from those of linkage 21 used in the embodiment of Figures 1 and 2. As in the first described embodiment, roller 74 has two positions, an inactive or fully open position shown in Figure 3 in full line, and an active or de-braking position shown in Figure 3 in dashed line. The two positions are limited by an inactive position stop 75 and a maximum de-braking position stop 76. Ordinarily, roller carrying link 73 is retained in an inactive position by spring 77 or spring in de-braking valve 68. When excessive braking occurs (but only during forward movement of the vehicle as indicated by arrows 78 and 79) the spinning inertia of roller 74 causes it to fly through a few degrees of arc to the de-braking or shut-off position towards or against de-braking position stop 76. The operation of de-braking valve 68 is the same as described in connection with Figures 1 and 2. However, roller carrying link 73 is rotatably pinned by pin 80 at its upper end to backing plate 61 at a point on a brake drum center line passing through the inactive position of roller 74. Thus, when wheel locking occurs, roller 74 moves away from the inactive position and loses contact with the interior of brake drum 60. Valve operating link 72 is pinned at its lower end to an intermediate point 82 along roller carrying link 73 and is formed in an angle shape so as to clear axle 96 in either active or inactive position.

In the vertical sectional view of Figure 4, axle 96 and the remaining parts of the braking system are the same as seen in Figure 2 and described in connection with the embodiment of Figures 1 and 2.

Although the preferred embodiment of the invention has been illustrated with respect to hydraulic brakes it will be understood that the skid-sensing roller, the valve actuating linkage, and the de-braking valve may be employed in another species with air brakes; in still other species, the de-braking valve is replaced by cam means for interrupting the operation of mechanical brakes. In another species, the invention is applied to disc brakes, in which a skid-sensing roller with its axis of rotation normal to that of the axle is employed.

While the various preferred forms of the invention have been described and illustrated herein, the invention is not to be limited to the details of construction shown and described except as defined in the appended claims.

I claim:

1. In a brake for a rotating cylindrical brake drum having at least one arcuate shoe therein, a source of brake fluid under pressure, and an actuating arrangement moving one end of said shoe into engagement with said drum, said shoe and said actuating arrangement being mounted on a non-rotating structure associated with said drum, a means for preventing skidding which includes: a de-braking valve between said actuating arrangement and said source of brake fluid under pressure; a pendulum link pivotably mounted at one end on said non-rotating structure; a rolling member rotatably mounted in said pendulum link at a point substantially removed from the fulcrum thereof, said rolling member being adapted in one position of said pendulum link to roll on the interior surface of said drum and to swing clear of the surface of said drum and shift said pendulum link from an inactive to a de-braking position when said drum suddenly decelerates; a de-braking link connected to said pendulum link, and to said de-braking valve, and adapted to shut off said brake fluid when said roller member moves said pendulum link into said de-braking position; an inactive position stop mounted on said non-rotating structure at the inactive position location for said pendulum link; and spring means tending to retain said pendulum link in inactive position against said stop.

2. In a fluid braking apparatus for a vehicle, in which brakes are applied by the delivery of fluid under pressure from a brake fluid source to a brake actuator mounted on a non-rotating structure within a rotating brake drum, and wherein at least one arcuate brake shoe is moved into engagement with the interior surface of said drum when said brake actuator is supplied with fluid under pressure, a skid prevention means for shutting off said brake fluid from said brake actuator whenever said brake drum experiences very rapid deceleration, which means includes: a shut-off valve mounted on said non-rotating structure within said brake drum between said source of brake fluid and said brake actuator; a skid-sensing roller adapted to roll on the interior surface of said drum; a roller bearing link at one end of which said roller is rotatably mounted, said link being movable to permit said roller member to move relative to the surface of said drum through a few degrees of arc; a valve actuating link adapted at one end to operate said shut-off valve and at the other end to be moved by said roller bearing link between an inactive position with said shut-off valve fully open and a de-braking position with said shut-off valve closed; an inactive position stop mounted on said non-rotating structure and locating said roller bearing link at an inactive position corresponding to said inactive position for said valve actuating link; and spring means for holding said roller bearing link in its inactive position, but yieldably permitting movement of said roller under its own momentum upon any sudden deceleration of said brake drum, thereby operating said shut-off valve and interrupting braking action.

3. In a fluid pressure braking apparatus for a vehicle, wherein a cylindrical drum rotates with a wheel, and at least one arcuate shoe, mounted on non-rotating structure associated with said drum is adapted to be moved into engagement with the inner surface of said drum by a fluid pressure actuator when brake application causes fluid under pressure to be delivered to said actuator via a fluid pressure brake line, a means for inhibiting skidding, which means includes: a shut-off valve mounted on said non-rotating structure and adapted to interrupt the delivery of fluid under pressure from said fluid pressure line to said fluid pressure actuator, and thereby interrupt and discontinue braking action; a skid-sensing roller adapted to roll on the interior surface of said brake drum when said drum is placed in rotation by the movement of said vehicle; a mechanical linkage consisting of at least two pin-connected links, one end of said linkage being connected to said shut-off valve and adapted to move it to an open or closed position, and said roller being rotatably mounted in the other end of said linkage; a stop mounted on said non-rotating structure and adapted to locate said linkage in an inactive position corresponding to an open position of said shut-off valve; and a spring means urging said linkage into said inactive position.

4. A means as described in claim 3 in which said mechanical linkage includes spring means urging said roller into contact with said drum surface.

5. In a brake for a rotating cylindrical drum wherein a source of fluid pressure operates a brake actuating mechanism mounted on a non-rotating mounting structure and causes an arcuate shoe to move into engagement with the inner surface of said drum, an automatic means for inhibiting skidding, which means includes: a shut-off valve mounted on said non-rotating structure and connected in said fluid pressure braking system between said source of pressure and said brake actuating mechanism; a pair of links pivotably connected to each other, the first of said links being connected to operate said shut-off valve, and the second link having one end springably urged toward said drum surface; a rolling member adapted to roll on the interior surface of said drum and rotatably mounted in said second link; a pair of stops mounted on said non-rotating structure and adapted to limit the movement of said second link between two positions, corresponding to open and shut positions for said shut-off valve; and spring means yieldably urging said second link away from said shut-off position.

6. In a brake for a rotating cylindrical drum, wherein a source of fluid pressure operates a brake actuating mechanism mounted on a non-rotating mounting structure and causes said mechanism to move an arcuate shoe into engagement with the inner surface of said drum, an automatic skid prevention means which includes: a de-braking valve mounted on said non-rotating structure and connected between said source of fluid pressure and said brake actuating mechanism; a pair of links pivotably connected to each other, the first of said links being connected to operate said de-braking valve; a roller member rotatably mounted on the second of said links, said rolling member being adapted to roll on the interior surface of said drum; an inactive position stop mounted on said non-rotating structure and adapted to locate said pair of links in an inactive position in which said de-braking valve is fully opened and permits full braking action; a first spring yieldably urging said links into said inactive position against said inactive position stop; and a second spring acting between said first and second links and urging said roller member into rolling contact with the interior of said drum.

7. In a brake for a rotatable member having at least one shoe therein, a source of fluid under pressure, and an actuating arrangement for moving said shoe into engagement with said rotatable member, said shoe and said actuating arrangement being mounted on a non-rotating structure associated with said rotatable member, a means for preventing skidding which includes: a de-braking valve between said actuating arrangement and said source of fluid under pressure for actuating said arrangement, said de-braking valve having a valve piston adapted when moved toward shut-off position, to move against the source of fluid pressure and thereby simultaneously shut-off fluid under pressure and reduce the pressure on said actuating arrangement; a skid-sensing roller adapted to roll on the surface of said rotatable member; a mechanical linkage consisting of at least two pin-connected links, one part of said linkage being connected to said de-braking valve and adapted to move it to an open or closed position, and said roller being rotatably mounted in another part of said linkage; and a stop mounted on said non-rotating structure and adapted to locate said linkage in an inactive position corresponding to an open position of said de-braking valve.

8. In a brake for a rotatable member having at least one shoe therein, a source of fluid under pressure, and an actuating arrangement for moving said shoe into engagement with said rotatable member, said shoe and said actuating arrangement being mounted on a non-rotating structure associated with said rotatable member, a means for preventing skidding which includes: a de-braking valve housing mounted on said non-rotating structure with an upstream passage communicating with said source of fluid under pressure and a downstream passage communicating with said actuating arrangement, said valve housing having an enlarged internal chamber between said upstream and downstream passages; a piston adapted to reciprocate in said upstream passage and longitudinally grooved in its upstream portion to permit the flow of fluid into said enlarged chamber and through said de-braking valve when said piston is located in its downstream position; spring means urging said piston into said downstream or open position; a piston depressing arrangement for moving said piston upstream against the force of said spring means and into a shut-off position; a skid-sensing roller adapted to roll on the surface of said rotatable member; a mechanical linkage consisting of at least two pin-connected links, one part of said linkage being connected to said piston depressing arrangement and adapted to move said piston to an open or closed position, and said roller being rotatably mounted in another part of said linkage; and a stop mounted on said non-rotating structure and adapted to locate said linkage in an inactive position corresponding to an open position of said de-braking valve.

9. In combination with a rotatable member, a brake, and means for applying said brake with pressure tending to lock said member against rotation, an automatic brake controlling element which includes: de-braking means for interrupting the application of said brake applying means; a skid-sensing roller member in rolling control with said rotatable member; resilient mounting for said roller member, said mounting being adapted to permit displacement of said roller member relative to said rotatable member when excessive deceleration of the latter occurs; and means responsive to said displacement of said roller member for operating said de-braking means.

10. In combination with a rotatable member, a brake, means for applying said brake with pressure tending to lock said member against rotation, and a non-rotating structure, an automatic means for preventing skidding which includes: a debraking means for interrupting the application of said brake applying means; a mechanical linkage system movably mounted on said non-rotating structure and adapted to operate said debraking means by movement relative to said non-rotating structure; a skid-sensing roller member rotatably mounted in said linkage system and movable with it relative to said non-rotating structure from a position in which said debraking means is inactive to a position in which said debraking means is operable, said roller member being in rolling contact with said rotatable member in at least part of its path of movement; and means normally retaining said linkage in said inactive position, but yieldingly permitting said linkage to shift to said debraking position when said rotatable member suddenly decelerates and the momentum of said skid-sensing roller member urges it to move relative to said rotatable member and said non-rotating structure.

11. In combination with a rotatable member, a fluid pressure brake system, a fluid motor means for applying said brake with pressure tending to lock said member against rotation, and a non-rotating structure, an automatic means for inhibiting skidding which includes: a debraking valve for interrupting the supply of fluid under pressure to said fluid motor means; a mechanical linkage system movably mounted on said non-rotating structure and adapted to operate said debraking valve by movements relative to said non-rotating structure; a skid-sensing roller member rotatably mounted in said linkage system and movable with it relative to said non-rotating structure from a position in which said debraking valve is inactive to a position in which said debraking valve operates to interrupt the flow of fluid to said fluid motor means, said roller member being in rolling contact with said rotatable member over at least a part of its passive movement; and means normally urging said roller member, and said linkage in which it is supported, into said inactive position but yieldingly permitting said linkage system to shift to said debraking position when said rotatable member suddenly decelerates and the momentum of said skid-sensing roller member urges it to move relative to said rotatable member and said non-rotating structure.

References Cited in the file of this patent

UNITED STATES PATENTS 2,418,288  Benning ---------------- Apr. 1, 1947

FOREIGN PATENTS 46,753  France ------------------ June 6, 1936

UNITED STATES PATENT OFFICE

CERTIFICATE OF CORRECTION

Patent No. 2,827,137

March 18, 1958

John A. Lockheed

It is hereby certified that error appears in the printed specification of the above numbered patent requiring correction and that the said Letters Patent should read as corrected below.

Column 8, line 32, for "control" read — contact —.

Signed and sealed this 8th day of July 1958.

(SEAL)

Attest:
KARL H. AXLINE
Attesting Officer

ROBERT C. WATSON
Commissioner of Patents